United States Patent [19]

Kim et al.

[11] Patent Number: 5,786,862
[45] Date of Patent: Jul. 28, 1998

[54] METHOD AND APPARATUS FOR INTERPOLATING PIXELS BASED ON WIDE-VECTOR CORRELATIONS

[75] Inventors: Yeong-Taeg Kim, Suwon; Yong-Hun Cho, Seoul, both of Rep. of Korea

[73] Assignee: Samsung Electronics Co., Ltd., Kyungki-do, Rep. of Korea

[21] Appl. No.: 723,118

[22] Filed: Sep. 30, 1996

[30] Foreign Application Priority Data

Sep. 30, 1995 [KR] Rep. of Korea ............... 95-33972
Sep. 6, 1996 [KR] Rep. of Korea ............... 96-38664

[51] Int. Cl.$^6$ ............................................. H04N 7/01
[52] U.S. Cl. ........................ 348/448; 348/452; 348/700
[58] Field of Search ............................. 348/448, 452, 348/700, 458, 910, 625, 629; 382/260, 300

[56] References Cited

U.S. PATENT DOCUMENTS

| | | | |
|---|---|---|---|
| 4,937,667 | 6/1990 | Choquet et al. | 348/448 |
| 5,208,667 | 5/1993 | Saunders | 348/452 |
| 5,483,288 | 1/1996 | Hong | 348/448 |
| 5,592,231 | 1/1997 | Clatanoff et al. | 348/452 |
| 5,600,377 | 2/1997 | David et al. | 348/452 |

FOREIGN PATENT DOCUMENTS

| | | | |
|---|---|---|---|
| 2 230 914 | 10/1990 | United Kingdom | H04N 7/01 |
| 2 231 460 | 11/1990 | United Kingdom | H04N 5/14 |

OTHER PUBLICATIONS

Proc. of the Int. Workshop on HDTV, "HT–TV Spatio–Temporal Upconversion", Bagni et al.; 1994.

Proc. of the Int. Workshop on HDTV, "Subband Based Upconversion Using Complementary Median Filters", H. Blume et al., 1994.

Signal Processing of HDTV, "Interlaced to Sequential Conversion for EDTV Applications", Doyle; Elsevier Science Publishers, North Holand, 1988, pp. 421–430.

IEEE Transaction on Consumer Electronics, "Comparison Between Median Filtering and Vertical Edge Controlled Interpolation for Flicker Reduction"; Hentschel; vol. 35, No. 3, pp. 279–289, Aug. 1989.

IEEE ISCAS–89, "Scan Rate Conversions Using Weighted Median Filtering", Juhola et al., Portand USA, May 1989, pp. 433–436.

Primary Examiner—Victor Kostak
Attorney, Agent, or Firm—Sughrue, Mion, Zinn, Macpeak & Seas, PLLC

[57] ABSTRACT

A method for interpolating pixel data of an omitted line by use of pixel data from an interlaced scan and an apparatus therefor are described. The pixel interpolation method and apparatus efficiently interpolate edges having various slopes according to a degree of correlation. When an edge has a gentle slope due to extensive correlation, interpolation is performed using a wide-vector. When an error occurs due to high-frequency components such as when bidirectional edges are found, simple vertical interpolation is performed.

21 Claims, 7 Drawing Sheets

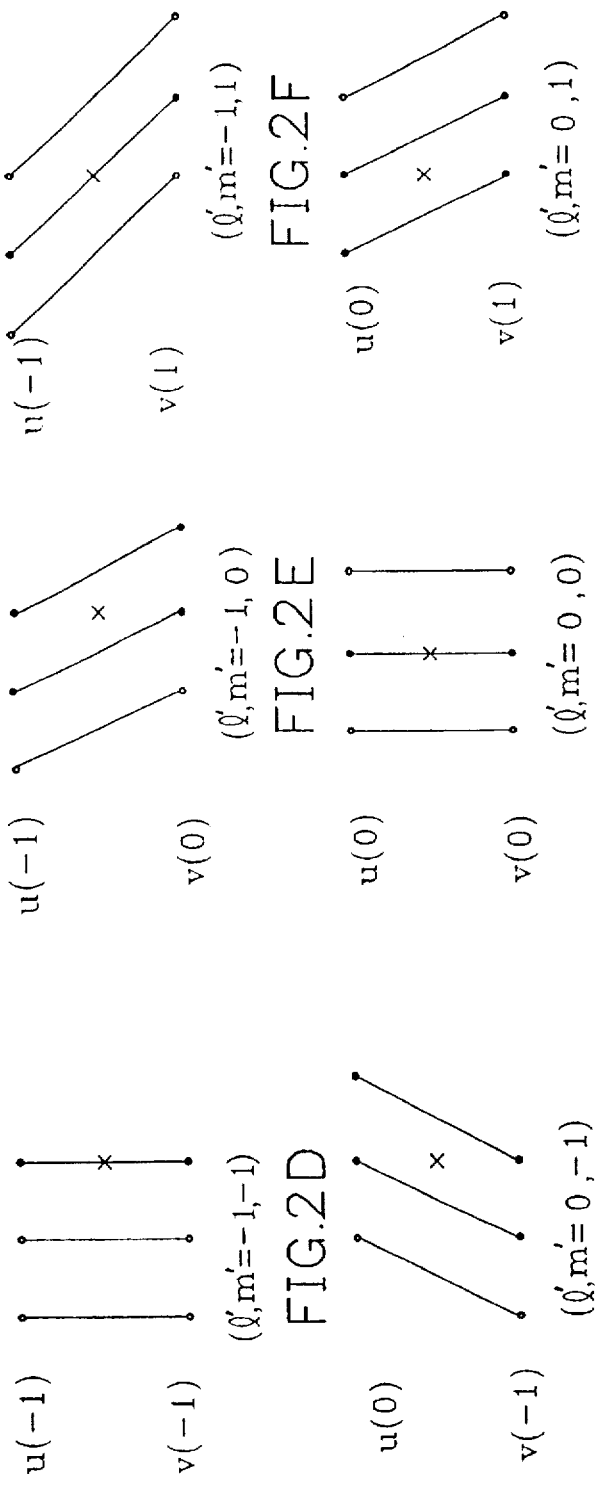

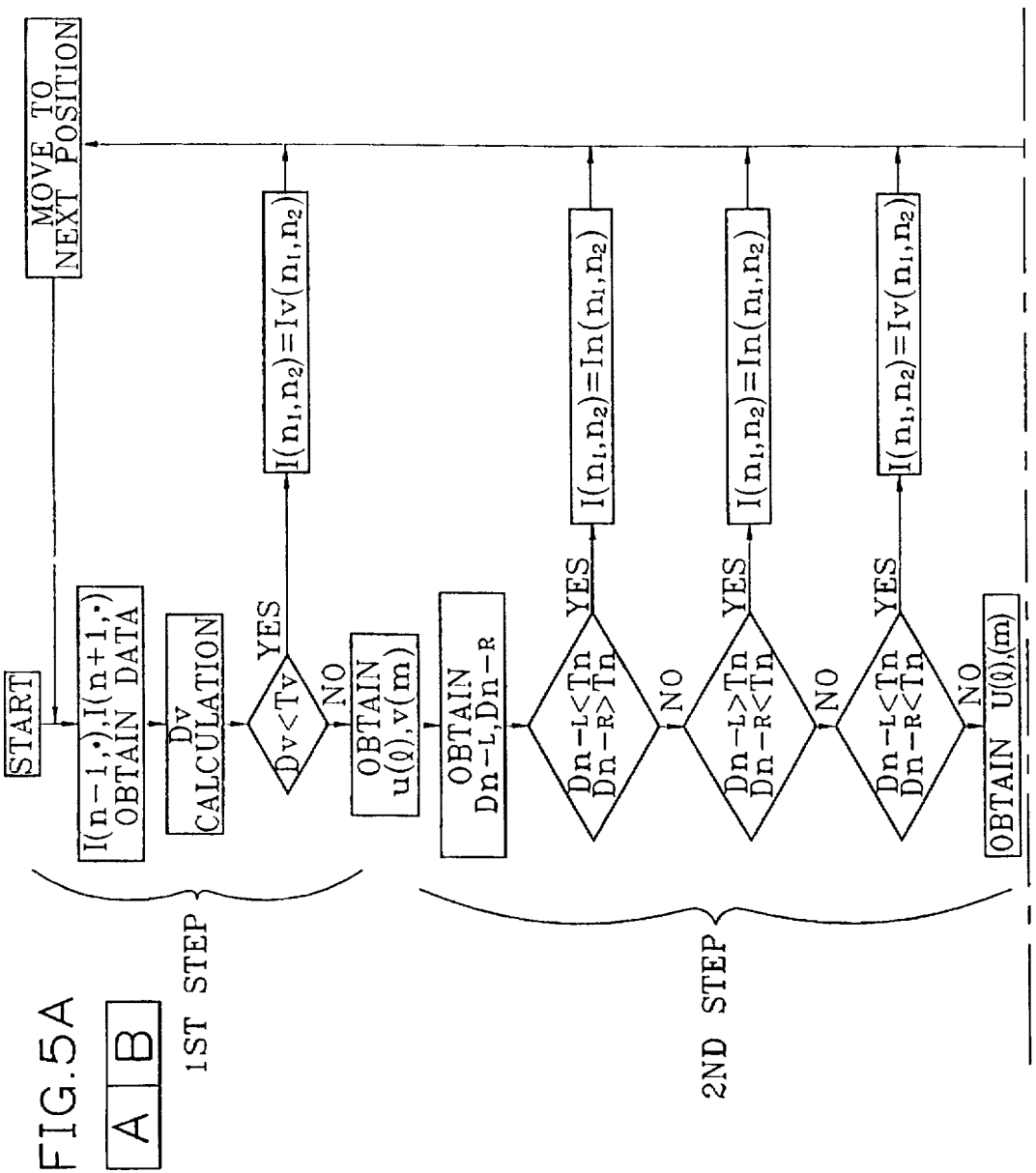
FIG.5A  A|B

METHOD AND APPARATUS FOR INTERPOLATING PIXELS BASED ON WIDE-VECTOR CORRELATIONS

BACKGROUND OF THE INVENTION

1. Field of the Invention

The present invention relates to a method for interpolating pixel data for an omitted line by use of pixel data from a line in an interlaced scan and an apparatus therefor, and more particularly, to a method for efficiently interpolating edges having various orientations using a wide-vector and an apparatus therefor.

2. Description of the Related Art

Interpolation of pixel data is essential in an interlaced-to-progressive conversion (IPC) operation which processes an interlaced scan signal and converts it into a progressive scan signal. IPC conversion is performed to reduce intrinsic aliasing caused by interlacing, which produces effects such as serrate lines, line crawling, line flicker, and field flicker.

Initially, interpolation methods were developed for NTSC systems. Thereafter, various interpolation methods have been proposed which have in common restoring through interpolation lines omitted during an interlaced scan.

Conventional interpolation methods are described in the following references:

[1] Simple line doubling scheme, vertical filtering, vertical edge controlled interpolation (disclosed in IEEE Transaction on Consumer Electronics, Vol. 35, No. 3, pp. 279–289, August, 1989 by D. I. C. Hentschei);

[2] Edge direction dependent deinterlacing method (disclosed in Proc. of the Int. Workshop on HDTV, 1994 by D. Bagni, R. Lancini, S. Landi, and S. Tubaro;

[3] Non-linear interpolation methods based on:
a weighted median filter (disclosed in Proc. IEEE ISCAS-89, Porland, USA, May 1989, pp. 433–436, by J. Juhola, A. Nieminen, J. Sal, and Y. Neuvo),
FIR median hybrid interpolation (disclosed in Proc. SPIE's Visual Communications and Image Processing, Lansanne, Switzerland, October 1990, pp. 125–132 by A Lehtonen and M. Renfors),
a complementary median filter (disclosed in Proc. of the Int. Workshop on HDTV, 1994 by H. Blume, I. Schwoerer, and K. Zygis),
direction dependent median filtering (disclosed in Signal Processing of HDTV, pp. 421–430, L. Chiariglion Ed., Elsevier Science Publishers, North Holand, 1988 by T. Doyle), and
a vertical-temporal axis median filter (disclosed in IEEE Transaction on Consumer Electronics, Vol. 32, No. 3, pp. 237–240, 1986 by P. Frencken and IEEE Digest of Technical Papers, pp. 186–187, 1986 by T. Doyle and P. Frencken); and

[4] A motion adaptive method (disclosed in IEEE Transaction on Consumer Electronics, Vol. 33, No. 3, pp. 266–271, August, 1989 by N. Suzuki and et al., and IEEE Transaction on Consumer Electronics, Vol. 36, No. 2, pp. 110–114, May 1990 by C. P. Markhauser).

However, the above-described conventional interpolation methods limit the range of data which can be used in an interpolation operation in order to restore lines omitted in an interlaced scan. As a result, edges having various orientations, including a gentle slope, cannot be detected which renders the conventional interpolation methods inappropriate for a high-definition television (HDTV) system requiring high resolution.

SUMMARY OF THE INVENTION

To solve the above problem, it is an object of the present invention to provide a two-dimensional interpolation method using correlation of a weighted wide-vector in which the range of data to be used in an interpolation operation expands in order to efficiently interpolate the data even for edges having a gentle slope.

To accomplish the above object of the present invention, there is provided a method for interpolating a pixel selected among pixels constituting a line between two lines selected from an image having a plurality of lines of pixels, the pixel interpolation method comprising:

(a) calculating narrow-vectors with respect to a plurality of adjoining pixels from among the pixels of the two selected lines and related to the selected pixel, and determining narrow-vectors therefrom having a minimum norm value, wherein the selected pixel to be interpolated is $I(n_1,n_2)$;

(b) interpolating pixels of the narrow-vectors having the minimum norm value when the narrow-vector minimum norm value determined in step (a) is smaller than a first predetermined value, and determining every wide-vector having a minimum norm value when the narrow-vector minimum norm value determined in step (a) is greater than the first predetermined value, wherein each of the wide-vectors includes a larger number of pixels than the number of pixels of each of said narrow-vectors from the two selected lines; and (c) interpolating the pixels of the wide-vector having the minimum norm value determined in step (b) when the determined narrow-vector minimum norm value is greater than the first predetermined value.

There is also provided an apparatus for interpolating a pixel selected from among pixels constituting a line between two lines selected from an image having a plurality of lines of pixels, the pixel interpolation apparatus comprising:

correlation means for calculating, using data of the pixels constituting the two selected lines, and outputting a vertical correlation value and a minimum norm value of narrow-vectors with respect to pixels adjoining and related to the selected pixel, and outputting information about a narrow-vector and a wide-vector;

vertical filter means for receiving the pixel data constituting the two selected lines and outputting a vertical interpolation value;

narrow-vector based filter means for receiving the pixel data constituting the two selected lines and the information about the narrow-vector having the minimum norm value from said correlation means and outputting a first interpolation value based on the narrow-vector;

wide-vector based filter means for receiving the pixel data constituting the two selected lines and the information about the wide-vector having the minimum norm value from said correlation means and outputting a second interpolation value based on the wide-vector; and selection means for comparing the vertical correlation value and the minimum norm values of the narrow-vectors which are input from said correlation means with first and second predetermined values, respectively, and selecting and outputting one of said first and second interpolation values based on the comparison.

BRIEF DESCRIPTION OF THE DRAWINGS

The preferred embodiments are described with reference to the drawings wherein:

FIGS. 2A through 2I are views for explaining positions of narrow-vectors u and v and data samples which are used for interpolation in the present invention.

FIG. 5A and 5B are flow-chart diagrams for explaining an interpolation method according to a second embodiment of the present invention.

DETAILED DESCRIPTION OF THE PREFERRED EMBODIMENT

Preferred embodiments of the present invention are described below in more detail with reference to the accompanying drawings.

In this specification $\{I(n_1-1, \cdot)\}$ and $\{I(n_2-1, \cdot)\}$ denote data samples produced by an interlaced scan operation. An interlaced-to-progressive conversion method means that image data of lines omitted in the interlaced scan, $\{I(n_1, \cdot)\}$ is obtained by interpolating data samples from the interlaced scan having samples $\{I(n_1-1, \cdot)\}$ and $\{I(n_1+1, \cdot)\}$. Hereinafter, embodiments of the present invention will be described with respect to the case in which pixel data $I(n_1, n_2)$ of lines omitted in the interlaced scan is obtained.

Figure 1:
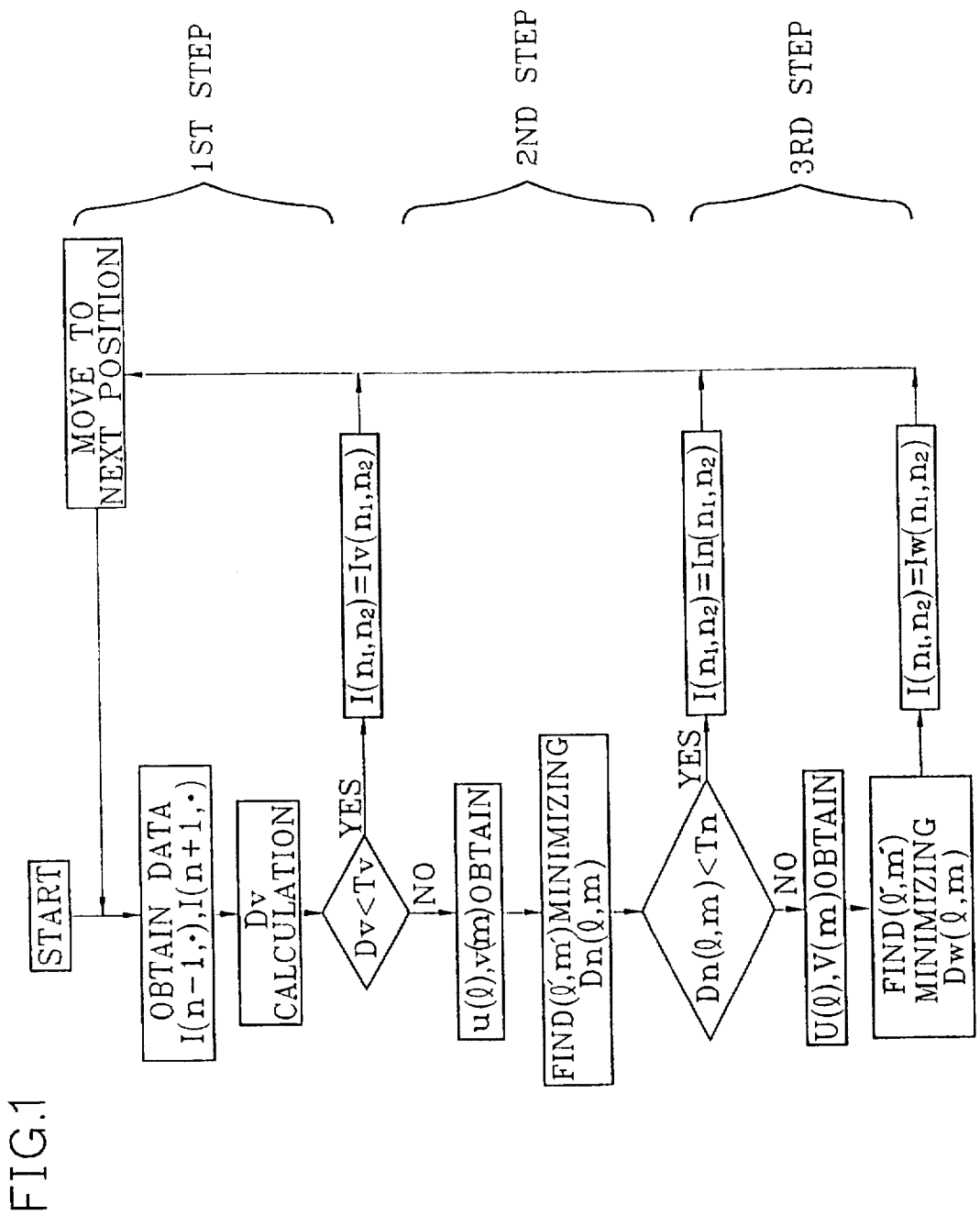
FIG. 1 is a flow-chart diagram for explaining an interpolation method according to a first embodiment of the present invention.

FIG. 1 is a flow-chart diagram illustrating an interpolation method based on wide-vector correlations according to the first embodiment of the present invention. Vertical interpolation is considered in the first step of FIG. 1. The vertical interpolation method obtains a weighted average value of image data which is proximately aligned in the vertical direction. This type of interpolation which is widely used because it is simple to perform and easy to implement.

This vertical interpolation method provides a satisfactory result when image data adjoining the vertical direction is highly correlated. However, when a vertical edge exists, vertical resolution is lowered. Meanwhile, when the slope of an edge is gentle, and accordingly the edge exists over the wide range, the entire picture flickers as a result of performing the interpolation operation.

In this embodiment of the present invention correlation between data sample lines adjoining the vertical direction is first calculated, and then it is determined whether the vertical interpolation operation is appropriate. When it is determined that vertical correlation is high, vertical interpolation is performed. Otherwise, a next step is performed using a larger number of image data samples.

Correlation between data samples adjoining the vertical direction is calculated according to equation (1) as follows.

$$D_v = |I(n_1-1,n_2) - I(n_1+1,n_2)| \qquad (1)$$

As the value of $D_v$, calculated with equation (1), becomes smaller, the vertical correlation becomes higher. In this embodiment, a reference correlation value $T_v$ is predetermined. When a calculated value $D_v$ is smaller than the predetermined value $T_v$, pixel data $I(n_1, n_2)$ is calculated by the vertical interpolation method discussed above. Since the vertical interpolation obtains a weighted average value of image data which is proximate to the vertical direction, vertically interpolated image data $I_v$ is calculated according to equation (2) as follows.

$$I_v(n_1,n_2) = w_{-1}I(n_1-1,n_2) + w_{+1}I(n_1+1,n_2) \qquad (2)$$

In equation (2), $w_{-1}$ and $w_{+1}$ represent weight values for the respective samples, in which $w_{-1}+w_{+1}=1$.

The first step in the method according to this embodiment of the present invention is expressed by equation (3) as follows.

$$I(n_1,n_2) = I_v(n_1,n_2), \text{ if } D_v < T_v \qquad (3)$$

When the vertically adjoining data samples have a low correlation, and thus $D_v$ is larger than predetermined $T_v$, vertical interpolation is not appropriate. In this case, a second step is performed. When $D_v$ is larger than $T_v$, an interpolation method based on an edge orientation should be used. In the second step, an edge having a larger slope is processed.

In the second step, narrow-vectors each having a length of 3 are used for determining of correlation. The narrow-vectors $u(l)$ and $v(m)$ each having a length of 3 are defined according to the following equations (4) and (5). The narrow-vectors $u(l)$ and $v(m)$ are defined using low-pass-filtered data samples $J(n_1-1, \cdot)$, $J(n_1+1, \cdot)$ which reduce an influence of the high-frequency components in the given data samples upon the correlation calculation.

$$u(l) = [J(n_1-1,n_2+l-1), J(n_1-1,n_2+l), J(n_1-1,n_2+l+1)] = [u_{-1}(l), u_0(l), u_{+1}(l)] \qquad (4)$$

$$v(m) = [J(n_1+1,n_2+m-1), J(n_1+1,n_2+m), J(n_1+1,n_2+m+1)] = [v_{-1}(m), v_0(m), v_{+1}(m)] \qquad (5)$$

In equation (4), $u(l)$ is composed of low-pass-filtered values from three adjoining data samples located at positions where they are spaced by l from $n_2$, the vertical axis, with reference to $I(n_1, n_2)$, as shown for example in FIG. 2A.

In equation (5), $v(m)$ is composed of low-pass-filtered values from three adjoining data samples located at positions where they are spaced by m from $n_2$ the vertical axis, with reference to $I(n_1, n_2)$.

Next it is determined whether the orientation of an edge is appropriate for interpolation using the narrow-vectors. A weighted norm $D_n$ of the narrow-vectors is calculated to determine if the narrow-vectors are highly correlated. The weighted norm $D_n$ of the narrow-vectors is defined by equation (6) as follows.

$$D_n(l,m) = \frac{1}{K} \sum_{i=-1}^{1} |u_i(l) - v_i(m)|c_i \qquad (6)$$

In equation (6), $c_i$ denotes a weight value and $K = c_{-1} + c_0 c_{+1}$.

The weighted norm $D_n$ defined by equation (6) represents the similarity between the two vectors $u(l)$ and $v(m)$. As the degree of similarity between the two vectors becomes higher, since the two vectors are highly correlated, the value of $D_n$ becomes smaller. As the correlation of the two vectors decreases, the value of $D_n$ increases. For example, in the case of the same two vectors, the value of $D_n$ is 0.

The variables l and m represent distances from the $n_2$ vertical axis, with respect to the two vectors. The variables l and m vary between $-1$ and $+1$ and $D_n$ is calculated according to equation (6), to determine two vectors having the minimum value of $D_n$. To simplify the calculation in the second step, the varying region of the variables l and m are limited. That is: l, m $\in[-1, +1]$.

Assuming that l and m which produce the minimum value of Dn correspond to l' and m', then $D_n$ is denoted as $D_n'$, which is expressed by equation (7) as follows.

$$D_n(l', m') = \text{Min } \{D_n(l, m) | l = -1, 0, +1, m = -1, 0, +1\} \quad (7)$$

$D_n(l',m')$ represents a degree of correlation between narrow-vectors which have the maximum correlation among the narrow-vectors adjacent to $I(n_1,n_2)$. When $D_n(l',m')$ is smaller than the predetermined value $T_n$, the correlation of the narrow-vectors is high, which is appropriate for the second step interpolation. In this case, the data samples corresponding to l' and m' are interpolated to obtain $I(n_1,n_2)$. Meanwhile, when $D_n(l',m')$ is larger than the predetermined value $T_n$, the correlation of the narrow-vectors is low. Thus, a third step is performed using wide-vectors.

FIGS. 2A through 2F are views for explaining positions of narrow-vectors u(l') and v(m') according to l' and m' and data samples which are used to obtain $I(n_1,n_2)$.

In FIGS. 2A–2F, the symbol "x" indicates a point of $I(n_1,n_2)$ to be obtained by interpolation. Narrow-vectors u(l) on the upper lines and narrow-vectors v(m) on the lower lines are indicted as "●" and "○" with reference to the symbol "x," respectively. The symbols "●" indicate samples which are geometrically adjacent to the point $I(n_1, n_2)$, in which the point $I(n_1,n_2)$ is determined by interpolation of the data samples for the points indicated by the symbols "●". For example, when (l',m')=(-1,-1), that is, l'=-1 and m'=-1 as shown in FIG. 2A, $D_n$ is minimized. The point $I(n_1,n_2)$ is determined by an arithmetic average of $I(n_1-1,n_2)$ and $I(n_1+1,n_2)$ indicated as "●" which is geometrically adjacent thereto. When (l',m')=(-1,0), as shown in FIG. 2B, the point $I(n_1,n_2)$ is determined by an arithmetic average of $I(n_1-1,n_2-1)$, $I(n_1-1,n_2)$, $I(n_1+1,n_2)$ and $I(n_1+1, n_2+1)$ indicated as "●".

When the point $I(n_1,n_2)$ determined by interpolation in the second step is $I_n(n_1,n_2)$, the point $I_n(n_1,n_2)$ is determined according to l' and m', referring to FIGS. 2A through 2I, and can be expressed as equations (8) through (16), as follows.

The second step in this embodiment can be summarized by the following equation (17).

$$I(n_1,n_2)=I_n(n_1,n_2), \text{ if } D_n>T_n, \text{ and } D_n(l',m')<T_n \quad (17)$$

When $D_n(l',m')$ is larger than $T_n$ in the second step, the correlation of the narrow-vectors is small, in which case interpolation using the narrow-vectors is not appropriate. Thus, a next step is performed using wide-vectors.

The wide-vectors used in the third step of this embodiment of the present invention are defined according to the following equations (18) and (19). Similarly to the narrow-band vectors, in order to reduce an influence of high-frequency components upon the correlation calculation, the wide-vectors are defined using the low-pass-filtered data samples $J(n_1-1, \cdot)$ $J(n_1+1, \cdot)$.

$$U(l) = [J(n_1 - 1, n_2 - L + l), \ldots, J(n_1 - 1, \quad (18)$$

$$n_2 + l), \ldots, J(n_1 - 1, n_2 + L + l)] =$$

$$[U_{-L}(l), \ldots, U_0(l), \ldots, U_L(l)]$$

$$V(m) = [J(n_1 + 1, n_2 - L - l + m) \ldots J(n_1 + 1, \quad (19)$$

$$n_2 - l + m) \ldots J(n_1 + 1, n_2 + L - l + m)] =$$

$$[V_{-L}(m), \ldots, V_0(m), \ldots, V_L(m)]$$

Here, L is a constant which relates to a length of the wide-vector. The length of each wide-vector is 2L+1, in which L is larger than or equal to 2. The wide-vector defined as set forth above provides more influence than does the narrow-vector.

According to equation (18), the wide-vector U(l) is composed of the low-pass-filtered values of (2L+1) data samples which are adjacent to points where it is spaced by l from the $n_2$ vertical axis on the upper line of $I(n_1,n_2)$. According to equation (19), V(0) is a symmetrical point to U(l) with respect to $I(n_1,n_2)$. V(m) can be obtained by moving a V(0) point which is point-symmetrical to U(l) by m, and has a length of 2L+1 in the case of U(l).

In the third step, a weighted norm $D_w(l,m)$ of the wide-vector is defined in order to determine correlation between the wide-vectors. The weighted norm $D_w(l,m)$ of the wide-vectors is expressed by the following equation (20).

$$I_n(n_1, n_2) = \frac{I(n_1 - 1, n_2) + I(n_1 + 1, n_2)}{2} \ ; \text{if } (l', m') = (-1, -1) \quad (8)$$

$$I_n(n_1, n_2) = \frac{I(n_1 - 1, n_2 - 1) + I(n_1 - 1, n_2) + I(n_1 + 1, n_2) + I(n_1 + 1, n_2 + 1)}{4} \ ; \text{if } (l', m') = (-1, 0) \quad (9)$$

$$I_n(n_1, n_2) = \frac{I(n_1 - 1, n_2 - 1) + I(n_1 + 1, n_2 + 1)}{2} \ ; \text{if } (l', m') = (-1, 1) \quad (10)$$

$$I_n(n_1, n_2) = \frac{I(n_1 - 1, n_2) + I(n_1 - 1, n_2 + 1) + I(n_1 + 1, n_2 - 1) + I(n_1 + 1, n_2)}{4} \ ; \text{if } (l', m') = (0, -1) \quad (11)$$

$$I_n(n_1, n_2) = \frac{I(n_1 - 1, n_2) + I(n_1 + 1, n_2)}{2} \ ; \text{if } (l', m') = (0, 0) \quad (12)$$

$$I_n(n_1, n_2) = \frac{I(n_1 - 1, n_2 - 1) + I(n_1 - 1, n_2) + I(n_1 + 1, n_2) + I(n_1 + 1, n_2 + 1)}{4} \ ; \text{if } (l', m') = (0, 1) \quad (13)$$

$$I_n(n_1, n_2) = \frac{I(n_1 - 1, n_2 + 1) + I(n_1 + 1, n_2 - 1)}{2} \ ; \text{if } (l', m') = (1, -1) \quad (14)$$

$$I_n(n_1, n_2) = \frac{I(n_1 - 1, n_2) + I(n_1 - 1, n_2 + 1) + I(n_1 + 1, n_2 - 1) + I(n_1 + 1, n_2)}{4} \ ; \text{if } (l', m') = (1, 0) \quad (15)$$

$$I_n(n_1, n_2) = \frac{I(n_1 - 1, n_2) + I(n_1 + 1, n_2)}{2} \ ; \text{if } (l', m') = (1, 1) \quad (16)$$

$$D_w(l, M) = \frac{1}{m} \sum_{i=-L}^{L} |U_i(l) - V_i(m)| C_i \qquad (20)$$

Here, $C_i$ is a weight value and $M = \Sigma C_i$.

Like $D_n$, the smaller the value of $D_w$ may be, the higher the correlation may be.

In the wide-vectors defined by equations (18) and (19), l and m are varied to determine wide-vectors whose weighted norm $D_w$ is minimized. The wide-vectors which have the minimum $D_w$ value have the maximum correlation.

To determine the wide-vectors having the minimum $D_w$ value in the third step, the region in which l is varied is limited, where $l \in [-S, +S]$. Here, to reduce errors close to the end of the line, S is smaller than or equal to L which is a constant relating to the length 2L+1 of the wide-vector.

The value of m is varied to have one of the values $-1$, $0$ and $+1$. Since V(m) is symmetrical to U(l), and V(m) can be obtained by moving the point V(0) point which is symmetrical to U(l) by m, and this varying region is enough even for the case of $[-1, 0, +1]$.

As described above, l and m are changed to obtain the values of l and m which minimize $D_w$, in which l and m are defined as l" and m", respectively. The minimum $D_w$ is expressed by the following equation (21).

$$D_w(l'',m'') = \text{Min}\{D_w(l,m) | l = -S, \ldots, 0, \ldots, +S, \text{ and } m = -1, 0, +1\} \qquad (21)$$

The values of l" and m" are determined in equation (21), in which the wide-vector to be used for interpolation is determined. Interpolation of the third step of this embodiment is performed by using an arithmetic average of data samples which are located at the center of each wide-vector according to l" and m".

The value of $I(n_1, n_2)$ which is obtained by the interpolation in the third step is expressed by equation (22) as follows.

$$I_w(n_1, n_2) = \frac{I(n_1-1, n_2+1'') + I(n_1+1, n_2-1''+m'')}{2} \qquad (22)$$

The third step in this embodiment can be summarized by equation (23) as follows.

$$I(n_1, n_2) = I_w(n_1, n_2), \text{ if } D_v > T_v, \text{ and } D_n(l', m') > T_n \qquad (23)$$

Figure 3A:
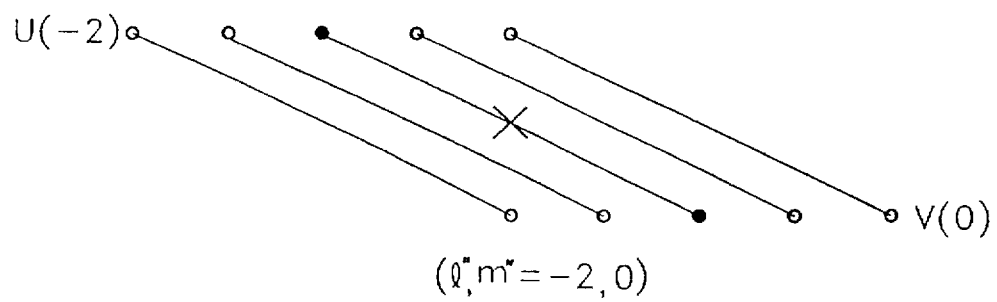
FIGS. 3A through 3C are views for explaining positions of wide-vectors U and V and data samples which are used for interpolation in the present invention, for the case where the length of the wide-vector is 5.
Figure 3B:
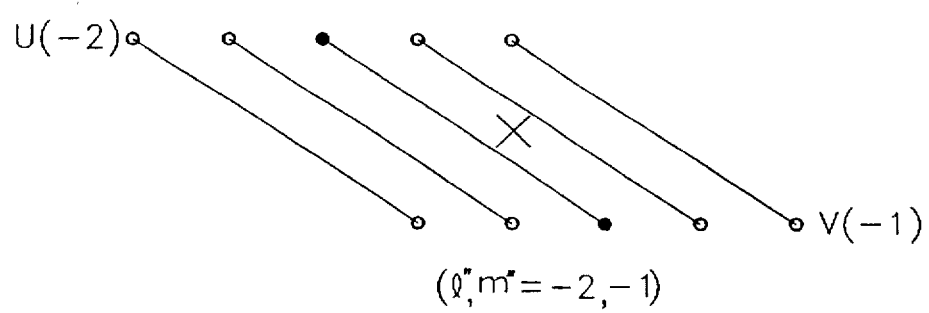
Figure 3C:
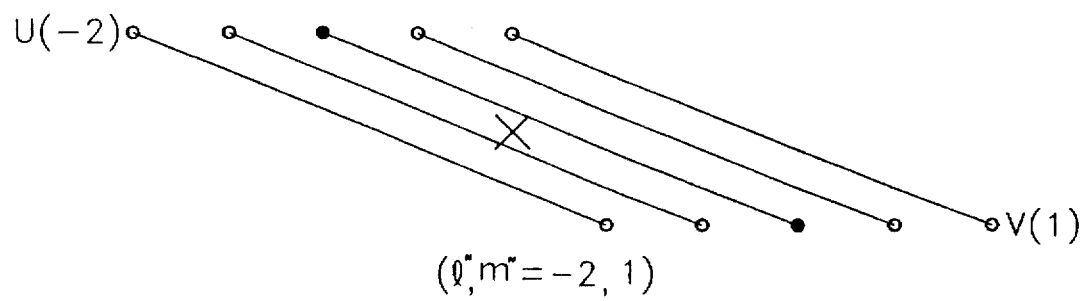

FIGS. 3A through 3C are views for explaining data samples which are used to obtain positions of wide-vectors U and V and $I(n_1, n_2)$ according to l" and m" determined in this embodiment, in which the length of the wide-vector is 5 (i.e., L=2).

In FIGS. 3A–3C, the symbol "x" indicates a position of $I(n_1, n_2)$ to be obtained by interpolation, and the symbols "●" indicates the center data of the wide-vector to be used for interpolation. For example, in FIG. 3A, (l", m") which minimizes $D_w$ is (-2,0), as indicated by "●" in this case. $I(n_1, n_2)$ is determined by an arithmetic average of the center data $I(n_1-1, n_2-2)$ of U(-2) and the center data $I(n_1+1, n_2+2)$ of V(0).

Figure 4:
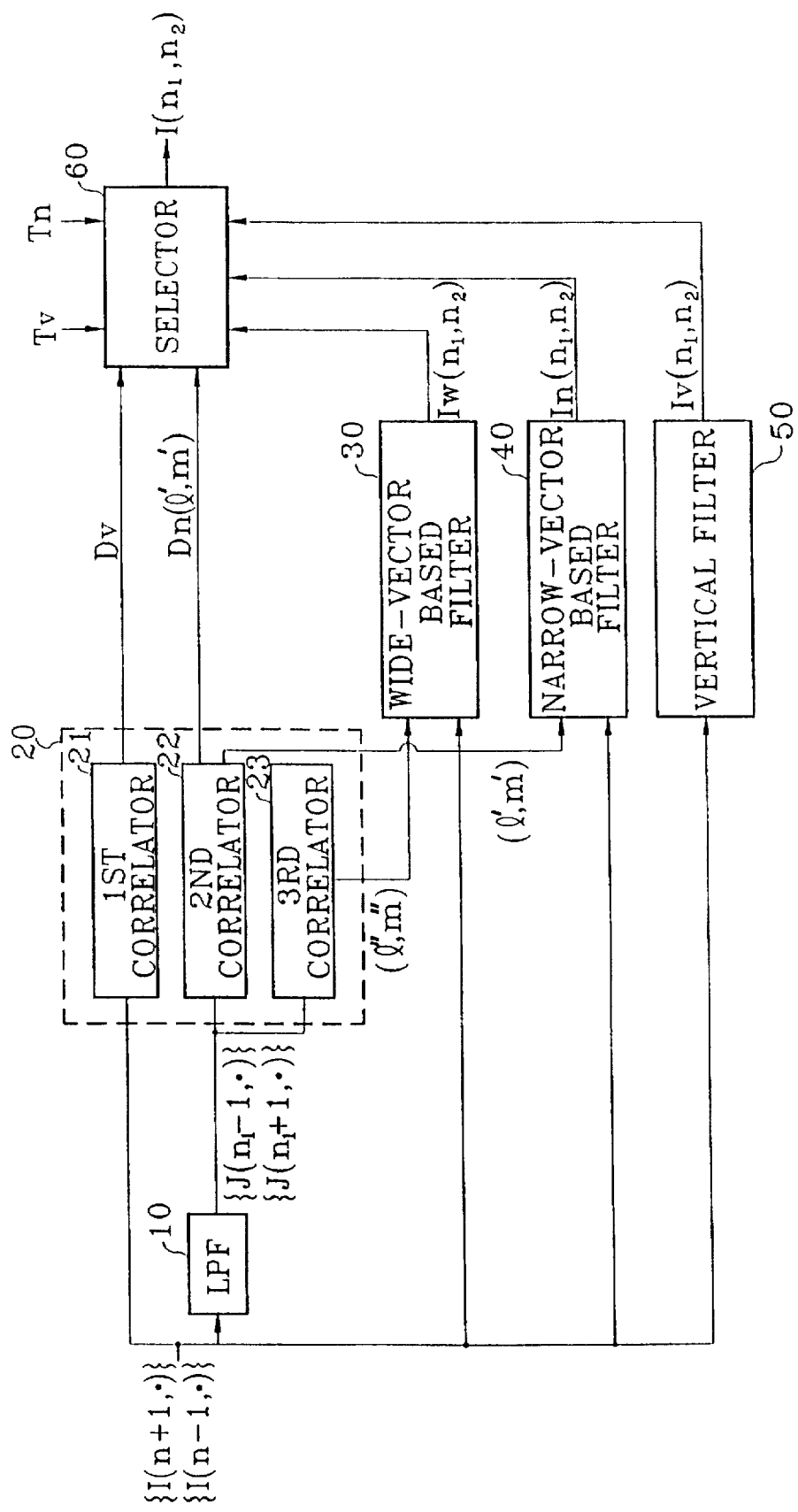
FIG. 4 is a block diagram of an interpolation apparatus embodying the interpolation method according to the first embodiment of the present invention.

FIG. 4 is a block diagram of an interpolation apparatus for performing the interpolation method according to the first embodiment of the present invention as described above.

In FIG. 4, data samples $I(n_1-1, \cdot)$ and $I(n_1+1, \cdot)$ provided by the interlaced scan are input directly to a correlator unit 20 and input indirectly to the correlator unit 20 via a low-pass filter (LPF) 10. The low-pass-filtered data samples produced by the LPF 10 are indicated as $J(n_1-1, \cdot)$ and $J(n_1+1, \cdot)$.

A first correlator 21 in correlator unit 20 calculates and outputs $D_v$ from the input data samples $I(n_1-1, \cdot)$ and $I(n_1+1, \cdot)$. A second correlator 22 in correlator unit 20 generates l' and m', which minimize $D_n$, from the low-pass-filtered data samples $J(n_1-1, \cdot)$ and $J(n_1+1, \cdot)$ and outputs l', m' and $D_n(l', m')$. A third correlator 23 in correlator unit 20 generates l" and m", which minimize $D_w$, from the low-pass-filtered data samples $J(n_1-1, \cdot)$ and $J(n_1+1, \cdot)$ and outputs l", m" and $D_w(l'', m'')$.

A wide-vector based filter 30 receives l" and m" from third correlator 23 and the input data samples $I(n_1-1, \cdot)$ and $I(n_1+1, \cdot)$ and outputs an interpolation value $I_w(n_1, n_2)$ based on the wide-vector.

A narrow-vector based filter 40 receives l' and m' from second correlator 22 and the input data samples $I(n_1-1, \cdot)$ and $I(n_1+1, \cdot)$ and outputs an interpolation value $I_n(n_1, n_2)$ based on the narrow-vector.

A vertical filter 50 receives the input data samples $I(n_1-1, \cdot)$ and $I(n_1+1, \cdot)$ and outputs a vertical interpolation value $I_v(n_1, n_2)$.

A selector 60 receives predetermined values $T_v$ and $T_n$, $D_v$ from correlator 21, $D_n(l', m')$ from second correlator 22, $I_w$ from wide-vector based filter 30, $I_n$ from narrow-vector based filter 40, and $I_v$ from vertical filter 50, and selects and outputs $I_v$ when $D_v < T_v$, $I_n$ when $D_v < T_v$ and $D_n(l', m') < T_n$ and $I_w$ when $D_v > T_v$ and $D_n(l', m') < T_n$.

The interpolation value output from the above described apparatus becomes $I(n_1, n_2)$ after a boundary of the data to be used for interpolation is adjusted according to the orientation of the edge.

Figure 5B:
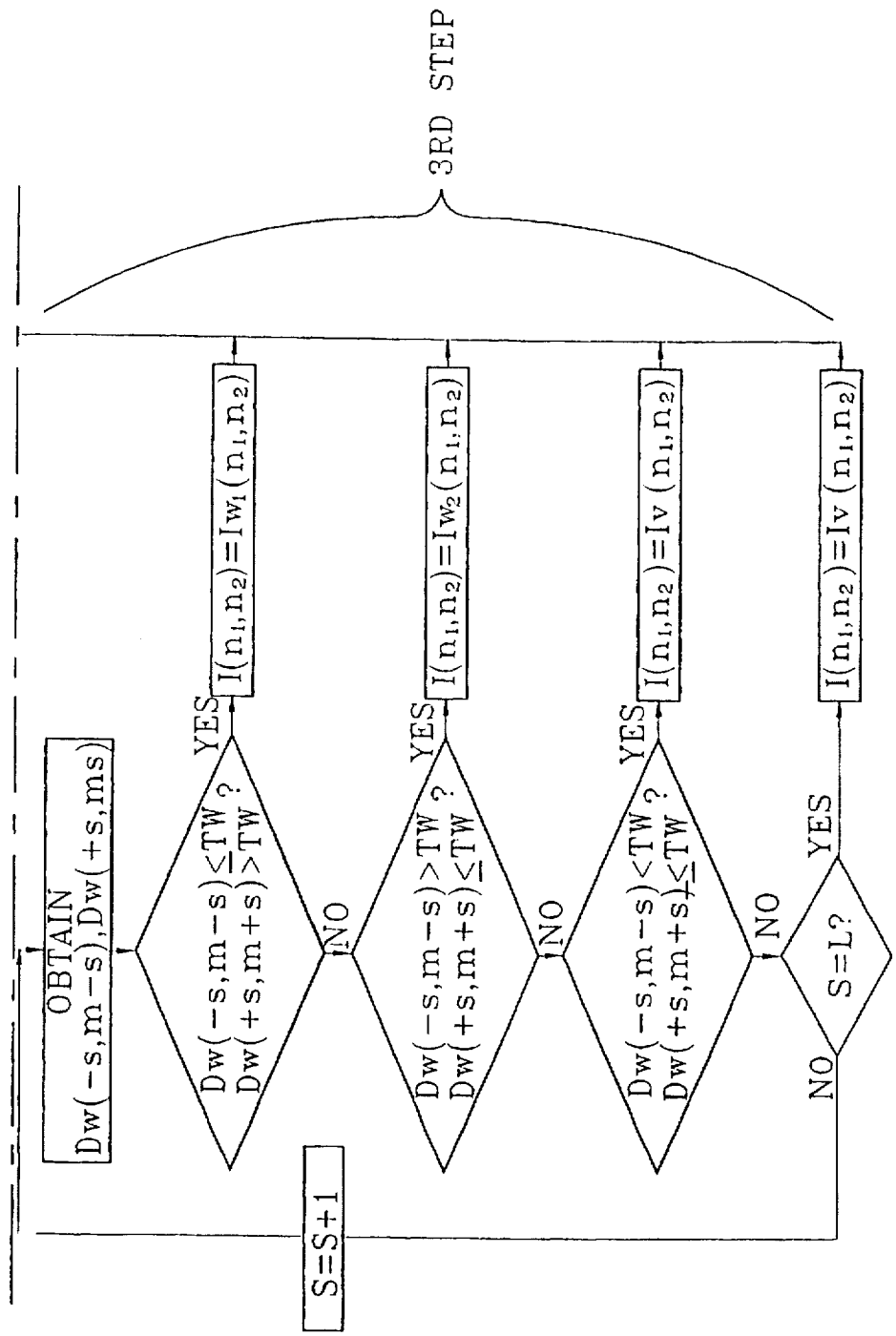

FIG. 5 is a flow-chart diagram for explaining an interpolation method according to a second embodiment of the present invention. Similar to the first embodiment, the second embodiment includes a first step of performing vertical interpolation according to a degree of vertical correlation, a second step of performing interpolation according to a narrow-vector, and a third step of performing interpolation according to a wide-vector.

Also, $D_v$, $D_n$, and $D_w$, the narrow-vectors u and v and the wide-vectors U and V, and the interpolation values $I_v$, $I_n$ and $I_w$ are defined in the same manner as in the first embodiment.

In the first step of performing vertical interpolation, when the vertical correlation value $D_v$ is smaller than the predetermined value $T_v$, a vertically interpolated value $I_v(n_1, n_2)$ is output. When $D_v$ is greater than $T_v$ in the first step, a second step is performed.

The narrow-vectors are used in the second step. The second step of the second embodiment does not perform interpolation with the narrow-vectors which simply have the minimum norm. If edges are found both to the left and right of the narrow-vector, it is determined that an error occurs, and simple vertical interpolation may suffice in this case. Thus, in the second embodiment, the minimum $D_n$ is obtained when a left-direction edge (l',m') is (-1,0), (-1,1) or (0,1), and the minimum $D_n$ is obtained when a right-direction edge (l',m') is (0,-1), (1,-1) or (1,0). Assuming that the minimum for a left-direction edge is denoted as $D_{n-L}$ and the minimum for a right-direction edge is denoted $D_{n-R}$, when one of $D_{n-L}$ and $D_{n-R}$ is smaller than the predetermined value $T_n$, interpolation is performed according to a corresponding narrow-vector. When both $D_{n-L}$ and $D_{n-R}$ are greater than $T_n$, the third step is performed using the wide-vector. When both $D_{n-L}$ and $D_{n-R}$ are smaller than $T_n$, simple vertical interpolation is performed since an edge is generated in both directions.

In the third step, $D_w$ is calculated bidirectionally in preparation for the case in which an error is generated. The calculated value of $D_w$ is compared with the predetermined value $T_w$. Interpolation is performed after determining the orientation of the edge. Here, the changing area of l is limited to two values, such as [−S,S], in which an initial value of S is set as 2. The value of m is varied to be one of −1, 0 or +1. First, when l is −S and l is +S, m which minimizes $D_w$ is obtained. Then, it is assumed that when l is −S, m which, minimizes $D_w$ is $m_{-s}$ and when l is +S, m which minimizes $D_w$ is $m_{+s}$. In this case, $D_w$ is expressed as equation (24) as follows.

$$D_w(-S,m_{-s})=\text{Min}\{D_w(-S, m)|m=-1,0,1\}$$

$$D_w(+S,m_{+s})=\text{Min}\{D_w(+S, m)|m=-1,0,1\} \quad (24)$$

Then, if $D_w(-S,m_{-s})$ and $D_w(+S,m_{+s})$ are compared with the predetermined value $T_w$ set as the correlation reference value, respectively, a orientation of the edge can be seen. When l is −S, the edge has a slope which slants from the left-upper portion to the right-lower portion. When l is +S, the edge has a slope which slants from the right-upper portion to the left-lower portion. Thus, when $D_w(-S,m_{-s})$ is smaller than $T_w$ and $D_w(+S,m_{+s})$ is greater than $T_w$, the left-upper data and the right-lower data have a high degree of correlation. Thus, the edge has a slope slanting from the left-upper portion to the right-lower portion.

When one of $D_w(-S,m_{-s})$ and $D_w(+S,m_{+s})$ is smaller than the predetermined value $T_w$, interpolation is performed using corresponding wide-vectors U(−S) and $V(m_{-s})$ or U(+S) and $V(m_{+s})$. When $D_w(-S,m_{-s})$ is smaller than $T_w$ and $D_w(+S,m_{+s})$ is greater than $T_w$, interpolation is performed using the center point between the wide-vectors U(−S) and $V(m_{-s})$. When $D_w(-S,m_{-s})$ is greater than $T_w$ and $D_w(+S,m_{-s})$ is smaller than $T_w$, interpolation is performed using the center point between the wide-vectors U(+S) and $V(m_{+s})$.

Meanwhile, when both $D_w(-S,m_{-s})$ and $D_w(+S,m_{+s})$ are smaller than the predetermined value of $T_w$, a bidirectional edge is found. This can be regarded as indicating that an error has actually occurred, and the high-frequency components are produced in many portions. Since the orientation of the edge cannot be detected in this case, it is preferable that simple vertical interpolation is performed to achieve a better quality picture.

Meanwhile, when both $D_w(-S,m_{-s})$ and $D_w(+S,m_{+s})$ are greater than the predetermined value $T_w$, S is increased by "1" and then when l is −S or +S, $D_w(-S,m_{-s})$ and $D_w(+S,m_{+s})$ are obtained. Then, the obtained values of $D_w(-S,m_{-s})$ and $D_w(+S,m_{+s})$ are repetitively compared with the predetermined value $T_w$. Although the above repeated comparison is performed until S becomes equal to L, if the orientation of the edge is not found, then simple vertical interpolation is also performed.

In the third step of the present embodiment, $I(n_1,n_2)$ which has been obtained by using the wide-vector is expressed as $I_{w1}(n_1,n_2)$ or $I_{w2}(n_1,n_2)$, which is expressed by equations (25) through (28) as follows.

$$I_{w1}(n_1, n_2) = \frac{I(n_1-1, n_2-S) + I(n_1+1, n_2+S+m_{-s})}{2} \quad (25)$$

if $D_w(-S, m_{-s}) \leq T_w, D_w(+S, m_{+s}) > T_w$ $$I_{w2}(n_1, n_2) = \frac{I(n_1-1, n_2+S) + I(n_1+1, n_2-S+m_{+s})}{2} \quad (26)$$

if $D_w(-S, m_{-s}) > T_w, D_w(+S, m_{+s}) \leq T_w$ $$I(n_1, n_2) = I_v(n_1, n_2) = \frac{I(n_1-1, n_2) + I(n_1+1, n_2)}{2} \quad (27)$$

if $D_w(-S, m_{-s}) \leq T_w, D_w(+S, m_{+s}) \leq T_w$ $S = S + 1$; if $D_w(-S, m_{-s}) > T_w, D_w(+S, m_{+s}) > T_w$; (28)

$$I(n_1, n_2) = I_v(n_1, n_2) = \frac{I(n_1-1, n_2) + I(n_1+1, n_2)}{2}$$ ;

if $D_w(-L, m_{-L}) > T_w, D_w(+L, m_{+L}) > T_w$

Figure 6:
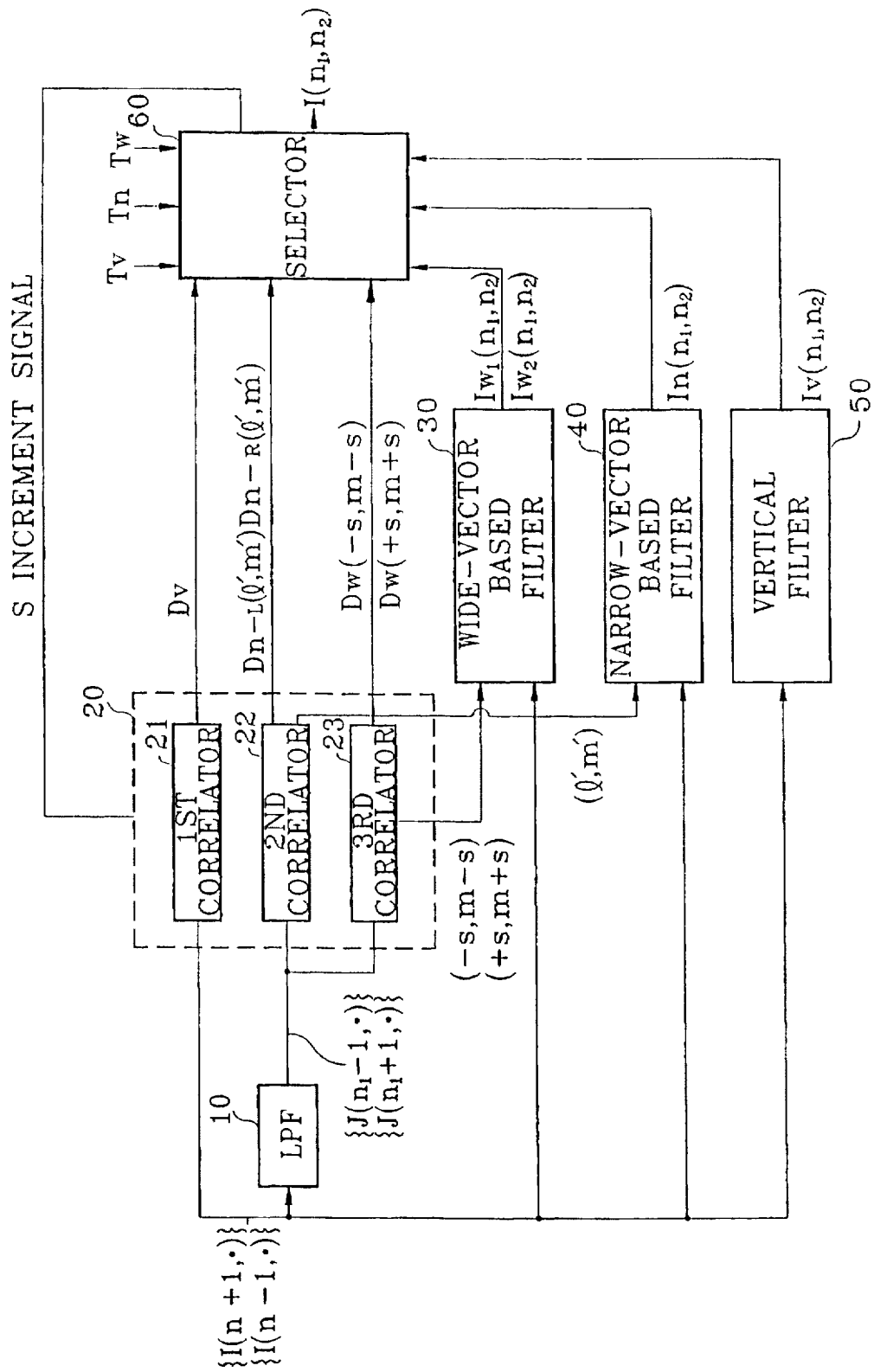
FIG. 6 is a block diagram of an interpolation apparatus embodying the interpolation method according to the second embodiment of the present invention.

FIG. 6 is a block diagram of an interpolation apparatus employing the interpolation method according to the second embodiment of the present invention.

In FIG. 6, data samples $I(n_1-1, \cdot)$ and $I(n_1+1, \cdot)$ generated by the interlaced scan are directly input to a correlator unit 20 and indirectly input to correlator unit 20 via a low-pass filter (LPF) 10. The low-pass-filtered data samples output from LPF 10 are indicated as $J(n_1-1, \cdot)$ and $J(n_1+1, \cdot)$.

A first correlator 21 in correlator unit 20 calculates and outputs $D_v$ from the input data samples $I(n_1-1, \cdot)$ and $I(n_1+1, \cdot)$. A second correlator 22 in correlator unit 20 generates l' and m' which minimize $D_{n-L}$ of a left-edge and $D_{n-R}$ of a right-edge from the low-pass-filtered data samples $J(n_1-1, \cdot)$ and $J(n_1+1, \cdot)$ and outputs l', m', $D_{n-L}(l',m')$, and $D_{n-R}(l',m')$. A third correlator 23 in correlator unit 20 generates $m_{-s}$ and $m_{+s}$ which minimize $D_w(-S,m)$ and $D_w(+S,m)$ from the low-pass-filtered data samples $J(n_1-1, \cdot)$ and $J(n_1+1, \cdot)$ and outputs (−S,m), (+S,m), $D_w(-S,m)$ and $D_w(+S,m)$ A wide-vector based filter 30 receives (−S,m) and (+S,m) from third correlator 23 and input data samples $I(n_1-1, \cdot)$ and $I(n_1+1, \cdot)$, and outputs an interpolation value $I_{w1}(n_1,n_2)$ and $I_{w2}(n_1,n_2)$ based on the wide-vector.

A narrow-vector based filter 40 receives l' and m' from second correlator 22 and input data samples $I(n_1-1, \cdot)$ and $I(n_1+1, \cdot)$, and outputs an interpolation value $I_n(n_1,n_2)$ based on the narrow-vector.

A vertical filter 50 receives the input data samples $I(n_1-1, \cdot)$ and $I(n_1+1, \cdot)$ and outputs a vertical interpolation value $I_v(n_1;n_2)$ A selector 60 receives predetermined values $T_v$ and $T_n$, $D_v$ from first correlator 21, $D_n(l',m')$ from second correlator 22, $I_w$ from wide-vector based filter 30, $I_n$ from narrow-vector based filter 40, and $I_v$ from vertical filter 50, and selects and outputs $I_v$ when $D_v<T_v$, $I_n$ when $D_v>T_v$ and $D_n(l',m')<T_n$ and $I_w$ when $D_v>T_v$ and $D_n(l',m')<T_n$.

As described above, the present invention can efficiently interpolate edges having various orientations according to a degree of correlation. When an edge has a gentle slope due to extensive correlation, interpolation is performed using a wide-vector. When an error occurs due to high-frequency components, as is indicated when bidirectional edges are found, simple vertical interpolation is performed.

While only certain embodiments of the invention have been specifically described herein, it will apparent that numerous modifications may be made thereto without departing from the spirit and scope of the invention.

What is claimed is:

1. A method for interpolating a pixel selected among pixels constituting a line between two lines selected from an image having a plurality of lines of pixels, the pixel interpolation method comprising:

(a) calculating narrow-vectors with respect to a plurality of adjoining pixels from among the pixels of the two selected lines and related to the selected pixel, and determining narrow-vectors therefrom having a minimum norm value, wherein the selected pixel to be interpolated is $I(n_1,n_2)$;

(b) interpolating pixels of the narrow-vectors having the minimum norm value when the narrow-vector minimum norm value determined in step (a) is smaller than a first predetermined value, and determining every wide-vector having a minimum norm value when the narrow-vector minimum norm value determined in step (a) is greater than the first predetermined value, wherein each of the wide-vectors includes a larger number of pixels than the number of pixels of each of said narrow-vectors from the two selected lines; and (c) interpolating the pixels of the wide-vector having the minimum norm value determined in step (b) when the determined narrow-vector minimum norm value is greater than the first predetermined value.

2. The pixel interpolation method according to claim 1, wherein said narrow vectors are defined as:

$$u(l)=[J(n_1-1,n_2+l-1), J(n_1-1,n_2+l), J(n_1-1,n_2+l+1)]=[u_{-1}(l), u_0(l), u_{+1}(l)]$$

$$v(m)=[J(n_1+1,n_2+m-1), J(n_1+1,n_2+m), J(n_1+1,n_2+m+1)]=[v_{-1}(m), v_0(m), v_{+1}(m)],$$

wherein J is obtained by low-pass-filtering I, and l, m $\in[-1, 1]$.

3. The pixel interpolation method according to claim 2, wherein the narrow-vector minimum norm value is defined as:

$$D_n(l, m) = \frac{1}{K} \sum_{i=-1}^{1} |u_i(l) - v_i(m)| c_i$$

wherein $c_i$ represents a weight value and $K=c_{-1}+c_0+c_1$.

4. The pixel interpolation method according to claim 1, wherein said wide-vectors are defined as:

$$U(l)=[J(n_1-1,n_2-L+l), \ldots, J(n_1-1,n_2+l), \ldots, J(n_1-1,n_2+L+l)]=[U_{-L}(l), \ldots, U_0(l), \ldots, U_L(l)]$$

$$V(m)=[J(n_1+1; n_2-L-l+m) \ldots J(n_1+1, n_2-l+m) \ldots J(n_1+1, n_2+L-l+m)]=[V_{-L}(m), \ldots, V_0(m), \ldots, V_L(m)],$$

wherein L is a constant relating to a length (2L+1) of the wide-vector which-is larger than or equal to 2.

5. The pixel interpolation method according to claim 4, wherein said wide-vector minimum norm value is defined as:

$$D_w(l, m) = \frac{1}{M} \sum_{i=-L}^{L} |U_i(l) - V_i(m)| C_i$$

wherein $C_i$ represents a weight value and $M=\Sigma C_i$.

6. The pixel interpolation method according to claim 1, wherein said narrow vectors are defined as:

$$u(l) = [J(n_1 - 1, n_2 + l - 1), J(n_1 - 1, n_2 + l),$$

$$J(n_1 - 1, n_2 + l + 1)] = [u_{-1}(l), u_0(l), u_{+1}(l)]$$

$$v(m) = [J(n_1 + 1, n_2 + m - 1), J(n_1 + 1, n_2 + m),$$

$$J(n_1 + 1, n_2 + m + l)] = [v_{-1}(m), v_0(m), v_{+1}(m)],$$

wherein J is obtained by low-pass-filtering I, and l, m $\in[-1, 1]$;

the narrow-vector minimum norm value is defined as:

$$D_n(l, m) = \frac{1}{K} \sum_{i=-1}^{1} |u_i(l) - v_i(m)| c_i$$

wherein $c_i$ represents a weight value and $K=c_{-1}+c_0+c_1$;

said wide-vectors are defined as:

$$U(l) = [J(n_1 - 1, n_2 + L + l), \ldots, J(n_1 - 1, n_2 + l), \ldots,$$

$$J(n_1 - 1, n_2 + L + l)] = [U_{-L}(l), \ldots, U_0(l), \ldots, U_L(l)]$$

$$V(m) = [J(n_1 + 1, n_2 - L - l + m) \ldots J(n_1 + 1,$$

$$n_2 - l + m) \ldots J(n_1 + 1, n_2 + L - l + m)] =$$

$$[V_{-L}(m), \ldots, V_0(m), \ldots, V_L(m)],$$

wherein L is a constant relating to a length (2L+1) of the wide-vector which is larger than or equal to 2; and said wide-vector minimum norm value is defined as:

$$D_w(l, m) = \frac{1}{M} \sum_{i=-L}^{L} |U_i(l) - V_i(m)| C_i$$

wherein $C_i$ represents a weight value and $M=\Sigma C_i$.

7. The pixel interpolation method according to claim 1, wherein each narrow-vector has a length of 3 pixels and each wide-vector has a length of 5 pixels.

8. The pixel interpolation method according to claim 1, further comprises performing vertical interpolation, before calculating the narrow-vectors, when a vertical interpolation value of two pixels in the vertical position of the selected pixel which are located in the two selected lines is less than a second predetermined value, and otherwise performing said step (a).

9. The pixel interpolation method according to claim 1, wherein narrow-vectors having the minimum norm values are obtained with respect to the left and right directions in step (a), and interpolation is performed in step (b) using the narrow-vectors when one of the minimum norm values with respect to the left and right directions is smaller than the first predetermined value $T_n$, said step (c) is performed when both the minimum norm values with respect to the left and right directions are greater than $T_n$, and vertical interpolation is performed in step (b) when both the minimum norm values with respect to the left and right directions are smaller than $T_n$.

10. The pixel interpolation method according to claim 6, wherein when l is −S or +S which satisfy $2 \leq S \leq L$, m is varied in an interval in step (b) to obtain the wide-vectors having the minimum norm value of step (a), and the norm values of the wide-vectors having the minimum norm value when l is −S and +S are compared with a second predetermined value, respectively, to detect the orientation of an edge, and then interpolation is performed in step (c) according to the orientation of the detected edge.

11. The pixel interpolation method according to claim 10, wherein in said step (c), if one of the minimum norm value of the wide-vector when l is −S and the minimum norm value of the wide-vector when l is +S is smaller than the second predetermined value, interpolation is performed using the wide vector; if both the minimum norm value of the wide-vector when l is −S and the minimum norm value of the wide-vector when l is +S, are smaller than the second predetermined value, vertical interpolation is performed; and if both the minimum norm value of the wide-vector when l is −S and the minimum norm value of the wide-vector when l is +S, are greater than the second predetermined value, S is increased and then step (c) is repeated when S<L, and vertical interpolation is performed when S=L.

12. The pixel interpolation method according to claim 1, wherein in said step (b), the interpolation using the narrow-vectors is performed by arithmetically averaging data of the pixels which are located proximate to the selected pixel among the pixels of the minimum norm value narrow-vector.

13. The pixel interpolation method according to claim 1, wherein in said step (c), the interpolation using the wide-vectors is performed by arithmetically averaging data of the center pixels of the minimum norm value wide-vector.

14. An apparatus for interpolating a pixel selected from among pixels constituting a line between two lines selected from an image having a plurality of lines of pixels, the pixel interpolation apparatus comprising:

correlation means for calculating, using data of the pixels constituting the two selected lines, and outputting a vertical correlation value and a minimum norm value of narrow-vectors with respect to pixels adjoining and related to the selected pixel, and outputting information about a narrow-vector and a wide-vector;

vertical filter means for receiving the pixel data constituting the two selected lines and outputting a vertical interpolation value;

narrow-vector based filter means for receiving the pixel data constituting the two selected lines and the information about the narrow-vector having the minimum norm value from said correlation means and outputting a first interpolation value based on the narrow-vector;

wide-vector based filter means for receiving the pixel data constituting the two selected lines and the information about the wide-vector having the minimum norm value from said correlation means and outputting a second interpolation value based on the wide-vector; and selection means for comparing the vertical correlation value and the minimum norm values of the narrow-vectors which are input from said correlation means with first and second predetermined values, respectively, and selecting and outputting one of said first and second interpolation values based on the comparison.

15. The pixel interpolation apparatus according to claim 14, wherein said correlation means further outputs a minimum value of wide-vectors with respect to pixels adjoining and related to the selected pixel.

16. The pixel interpolation apparatus according to claim 15, wherein said selection means further compares the minimum values of wide-vectors which are input from said correlation means.

17. The pixel interpolation apparatus according to claim 14, further comprising a low-pass filter for removing high-frequency components of the pixel data constituting the two selected lines before calculating the minimum norm values of the narrow and wide-vectors.

18. The pixel interpolation apparatus according to claim 17, wherein said correlation means comprises:

a first correlator for receiving the pixel data constituting the two selected lines and outputting a vertical correlation value of the pixels adjacent to the selected pixel;

a second correlator for receiving low-pass-filtered pixel data output from said low-pass filtering means and outputting the minimum norm value of the narrow-vectors of pixels adjacent to the selected pixel and narrow-vector information corresponding thereto; and a third correlator for receiving the low-pass-filtered pixel data output from said low-pass filtering means and outputting the minimum norm value of the wide-vectors of the pixels adjacent to the selected pixel and wide-vector information corresponding thereto.

19. The pixel interpolation apparatus according to claim 18, wherein said second correlator outputs the minimum norm value of the narrow-vectors with respect to left and right directions of an edge and the narrow-vector information corresponding thereto.

20. The pixel interpolation apparatus according to claim 19, wherein said third correlator outputs the minimum norm value of the wide-vectors with respect to the left and right directions of the edge and the wide-vector information corresponding thereto.

21. The pixel interpolation apparatus according to claim 20, wherein said selection means outputs a first vertical interpolation value when the minimum norm values of the narrow-vectors with respect to the right and left directions of the edge input from said second correlator are smaller than the predetermined first value, and outputs the vertical interpolation value when the minimum norm values of the wide-vectors with respect to the right and left directions of the edge input from said third correlator are smaller than the predetermined second value.

* * * * *